(12) United States Patent
Marestin et al.

(10) Patent No.: US 9,718,563 B2
(45) Date of Patent: Aug. 1, 2017

(54) METHOD AND DEVICE FOR REQUIREMENT CAPTURE FOR A SYSTEM FOR CENTRALIZED MAINTENANCE FOR AIRCRAFT

(71) Applicant: THALES, Neuilly-sur-Seine (FR)

(72) Inventors: Pascal Marestin, Toulouse (FR); Laurent Laval, Toulouse (FR); Christian Albouy, Villemur sur Tarn (FR)

(73) Assignee: Thales, Courbevoie (FR)

( * ) Notice: Subject to any disclaimer, the term of this patent is extended or adjusted under 35 U.S.C. 154(b) by 200 days.

(21) Appl. No.: 13/891,093

(22) Filed: May 9, 2013

(65) Prior Publication Data

US 2013/0304303 A1    Nov. 14, 2013

(30) Foreign Application Priority Data

May 11, 2012    (FR) ...................... 12 01374

(51) Int. Cl.
| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B64F 5/00* | (2017.01) | |
| *G06Q 10/00* | (2012.01) | |
| *G05B 23/02* | (2006.01) | |
| *B64F 5/40* | (2017.01) | |

(52) U.S. Cl.
CPC .............. *B64F 5/0081* (2013.01); *B64F 5/40* (2017.01); *G05B 23/0267* (2013.01); *G06Q 10/20* (2013.01)

(58) Field of Classification Search
None
See application file for complete search history.

(56) References Cited

U.S. PATENT DOCUMENTS

| | | | | |
|---|---|---|---|---|
| 4,943,919 | A | * | 7/1990 | Aslin ..................... G07C 5/085 340/500 |
| 6,859,688 | B1 | * | 2/2005 | Orf ......................... G01C 25/00 701/14 |
| 2004/0078123 | A1 | | 4/2004 | Igloi et al. |
| 2005/0075769 | A1 | | 4/2005 | Eschborn et al. |
| 2008/0284618 | A1 | | 11/2008 | Fabas et al. |
| 2010/0100286 | A1 | * | 4/2010 | Genissel ............ G05B 23/0286 701/48 |
| 2011/0270482 | A1 | | 11/2011 | Holzer | |

FOREIGN PATENT DOCUMENTS

| | | |
|---|---|---|
| EP | 1280316 A2 | 1/2003 |
| EP | 2149823 A1 | 2/2010 |
| FR | 2915292 A1 | 10/2008 |

\* cited by examiner

*Primary Examiner* — Lail Kleinman
(74) *Attorney, Agent, or Firm* — Baker Hostetler LLP

(57) ABSTRACT

A requirement capture device for a centralized maintenance system for aircraft is composed of a means for capturing and parametrizing the various characteristics of the centralized maintenance system. It allows the various parties to the fine tuning of the CMS system to define the data set specific to their domain in a common framework. User profiles are defined for each of the users affording them configuration possibilities specific to their domain. After validation of the parameters input, a configuration file is generated.

13 Claims, 2 Drawing Sheets

METHOD AND DEVICE FOR REQUIREMENT CAPTURE FOR A SYSTEM FOR CENTRALIZED MAINTENANCE FOR AIRCRAFT

CROSS-REFERENCE TO RELATED APPLICATION

This application claims priority to foreign French patent application No. FR 1201374, filed on May 11, 2012, the disclosure of which is incorporated by reference in its entirety.

FIELD OF THE INVENTION

The invention relates to the field of maintenance systems for aircraft and more particularly to a requirement capture method and device for such a system.

BACKGROUND

The main function of the centralized maintenance of an aircraft is to make, in real time or at the end of the flight, a diagnosis of the general situation of the aircraft on the basis of a summary of the fault messages received from the various items of equipment of the aircraft.

Maintenance also fulfils other functions such as the correlation of the fault messages received with the alarms received at the level of the flight deck, the conduct of the particular tests on the equipment undertaken on request by an operator or the drafting of reports intended for the ground maintenance teams, reports containing a log of the fault messages issued by the various items of equipment of the aircraft and of the alarms presented to the crew as well as a summary of the fault messages, carried out as a last resort. More generally, the reports contain all the information about the operating states of the equipment, liable to ease the work of the ground maintenance team.

Conventionally, through its functionality, the centralized maintenance system is connected to several tens of items of equipment of the aircraft, each being able potentially to generate tens or indeed hundreds of fault messages.

The development and the maintenance of such a system is complex and expensive since it depends not only on the technical specifications of the aircraft's equipment but also on the operational customs and procedures of aircraft manufacturers and operators.

The function adheres strongly to the aeroplane system definition. Fine tuning is lengthy and complex due to the very large number of connected items of equipment to be processed (more than 100 items of equipment per aeroplane) and to the diversity of the protocols. The lengthening is significant for system integration and the maturation of the diagnosis performance.

Moreover this fine tuning necessitates the involvement of personnel from different cultures, be it the equipment supplier (Member system), the designer of the maintenance system or the designer of the aircraft.

The difficulty with this multiplicity and with this diversity is that the maintenance information must be captured and formalized in an unambiguous, complete and consistent manner.

Hitherto information capture has been carried out for the major part through aircraft systems specification documents. No formalism is applied to guarantee the homogeneity, consistency and completeness of the information.

Moreover this capture phase is lengthy, iterative and made complicated by the large number of items of equipment to be managed and the diversity of the parties involved in the fine tuning of the system.

Defects not detected during this phase will disturb and prolong the integration activities, and necessitate new capture iterations to obtain a complete, accurate and unambiguous definition of the system data.

Solutions exist which make it possible to ease the inputting of the information via computing tools but none proposes to integrate it into a wider solution integrating an input device, data verification mechanisms, and implementing a process which will tailor the information level shared and define all of the information that may be furnished by the diverse designers of the maintenance system.

So there exists the requirement for an overall solution which makes it possible to capture in a complete manner the maintenance requirements of an aircraft.

SUMMARY OF THE INVENTION

The present invention addresses this requirement.

An object of the present invention is to offer a device and a method for defining and capturing in an iterative and complete manner the maintenance requirements of an aircraft and to validate the consistency of the data captured by the device.

Advantageously, the present invention allows the characteristics of the maintenance messages to be input more rapidly and in an unambiguous manner and the consistency and the validity of the maintenance messages to be ensured automatically through the centralization of all of the information.

Another object of the present invention is to allow the collection of the information by a process based on the management of user profiles over which the user has control.

Advantageously, the sharing of the information between the various users involved in the fine tuning of the centralized maintenance system (CMS) is guaranteed.

Advantageously, the present invention guarantees the completeness and the correctness of the requirement capture for the centralized maintenance of an aircraft.

Another object of the present invention is to provide a system tailored to the user, be it aeroplane equipment manufacturer or rigger.

Advantageously, the present invention offers a man-machine interface (MMI) for input which allows previewing of the content of the MMI pages of the system.

Advantageously, the present invention ensures the production of configuration databases utilizable by the centralized maintenance system.

Advantageously, the present invention applies in a dynamic manner to any new CMS environment.

Advantageously, the present invention will be implemented in the context of the aeronautical industry.

To obtain the results sought, a device, a method and a computer program product are proposed.

In particular, a requirement capture device for a centralized maintenance system (CMS) for aircraft comprises:
  a module for inputting parameters relating to configuration domains for the CMS;
  a verification module coupled to the input module for verifying the compliance of the parameters input with the configuration domains for the CMS;
  a generating module coupled to the input module for generating requirement capture files; and a storage module for storing the requirement capture files generated.

Various implementation variants are described.

BRIEF DESCRIPTION OF THE DRAWINGS

Various aspects and advantages of the invention will become apparent, supported by the description of a preferred but nonlimiting mode of implementation of the invention, with reference to the figures hereinbelow.

DETAILED DESCRIPTION

Figure 1:
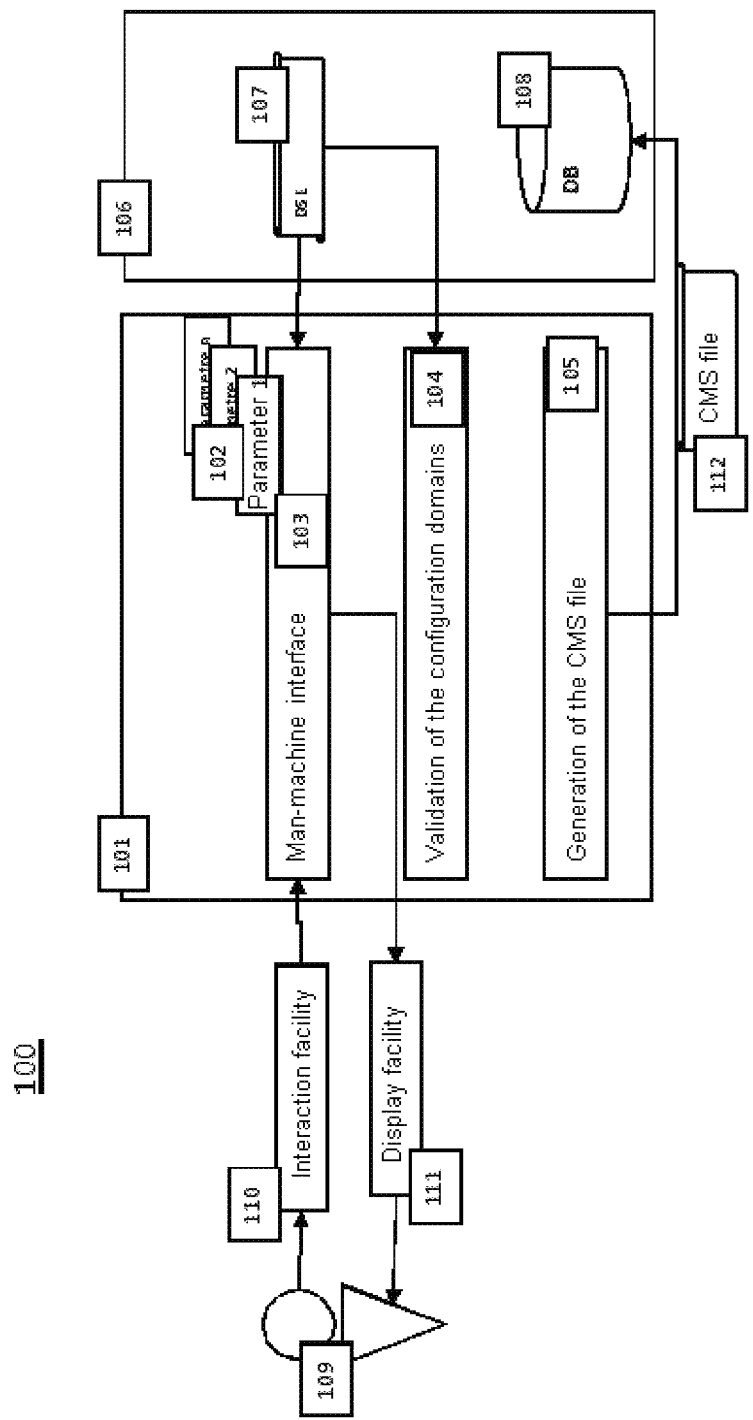
FIG. 1 shows the functional bricks of a device for requirement capture of a CMS according to the principles of the invention.

FIG. 1 illustrates a computing environment (100) making it possible to implement the device and to operate the method of the invention for capturing the requirement of a centralized maintenance system or CMS. FIG. 1 shows an example of the functional modules in a preferential implementation of the invention, without being limiting and allowing the person skilled in the art to implement variants.

The system 100 is composed of an input device 101 able to gather data so as to capture the requirement of a CMS.

The system comprises a storage module 106 for storing the data relating to the definition of the configuration domains for the CMS or "Domain Specific Language CMS" (DSL CMS) 107 and a database 108 of the requirement capture files 112.

The DSL CMS 107 expresses in a formal manner the various CMS domains, their configuration elements and the description of the configuration items.

The device advantageously comprises a verification module 104 whose role is to verify that the set of parameters 102 input complies with the DSL CMS 107, in terms of structure, domain of variation and consistency of the values.

A module 105 for generating a requirement capture file 112 is coupled to the verification module 104. The content and the structure of the file 112 are guaranteed compliant with the input and with the DSL CMS 107.

An interaction facility 110 allows the user 109 to input the parameters 102. The interaction facility 110 may be for example a computer keyboard, a voice recognition system, a touchscreen, or any other interaction facility transforming an action of the user into control of the input device 101.

A man-machine interface (MMI) 103 allows a user 109 to modify parameters 102 of the CMS in accordance with the DSL CMS 107, and/or to consult and modify a previously established requirement capture.

A display facility 111 allows the user 109 to assess the value and the structure of the parameters 102 and to ascertain the previously input information. The display facility 111 may be for example a computer screen, a graphical tablet, a tactile or audio device, or any other facility allowing the user to ascertain the content of the database 108.

The storage module 106 may be a memory integrated into a computer 100, but in an implementation variant it may be outsourced. This memory allows the storage of the definition of the configuration domain 107 and of the database 108. The memory 106 can be embodied for example by a hard disk, a FLASH memory, a USB store, a CD-ROM, etc. The DSL CMS 107 and the database 108 can also be stored in different memories. The computer 100 and the memory 106 communicate so as to allow data exchanges between the input module 101 and the memory. The connection between computer and memory can be wire-based (e.g. by electronic bus, USB cable, Ethernet cable, etc.) or wireless (e.g. Wifi, Bluetooth, etc.).

The DSL CMS configuration domains are advantageously distributed into 6 families:

Member Systems: Definition of the information characterizing the Member Systems connected to the CMS system.

System interfaces: Definition of the links between the CMS system and all the connected Member Systems as well as the interfaces with the systems providing the aircraft's state data.

Filtering/Correlation: Definition of the rules associated with the filtering and correlation functions.

MMI: Definition of the MMI pages of the CMS system and of its member Systems and of the navigation between the pages.

Interaction member Systems: Definition of the possibilities of dialogue between the maintenance operator and the member Systems.

CMS Logics: Definition of the logics specific to the CMS function, making it possible to tailor the system to the particular features of the aircraft aboard which it is embedded.

The definition of the data of each configuration domain is based:

on a set of compilation guides which is a set of rules making it possible to define the nature and the associated constraints each of the data. These guides make it possible for the user to have a better perception of the capture requirement and to improve the accuracy and the consistency of the information that he will furnish; and on a formal language, specific to the maintenance domain. The use of the formalism will ensure the homogeneity of the information furnished by all the users.

The following table provides a preferential example of the definitions of the six configuration domains. This table and its content are given solely by way of example and not as being limiting.

| Configuration domain | Configuration element | Description of the configuration items |
|---|---|---|
| Member Systems | Aircraft topology | Unambiguous identification of all the Member Systems connected to the CMS Definition of the associated ATA code Identifications of the electrical power supply systems connected to the member systems |
| | Intrinsic characteristics | For each member System: identification of its characteristics in terms of communication protocol: A624 A664, A624 A429, A604 BOFR, A604 StdA, or Type 3 identification of its constituent elements (LRUs): identifiers, names, associated ATA codes |

-continued

| Configuration domain | Configuration element | Description of the configuration items |
|---|---|---|
| | Fault messages | Definition of the characteristics of the fault messages specific to each Member system (see detail in following table)<br>Definition of the associated cockpit effect (FDE): code and description<br>Descriptive text to aid the operator to understand the fault |
| Interfaces | Aircraft topology | List of existing links between all the items of equipment connected to the CMS or to the member systems |
| | Interfaces | Functional description of the interfaces<br>Definition of the communication ports and IP addresses |
| CMS logics | CMS logics | Logics of calculations specific to the maintenance domain<br>Activation of the logics according to the characteristics of the aircraft |
| | ACARS triggers logics | Definition of the events triggering the transmission of information from the aircraft to a ground base |
| Filtering and Correlation | Filtering of the fault messages | Filtering rules applied to the particular fault messages or to all the fault messages of a member system, either in real time, at the moment they appear or at a later time so as to carry out post-processing |
| | Filtering of the CAS messages | Filtering rules applied to the CAS messages, either in real time, at the moment they appear or at a later time so as to carry out post-processing |
| | Correlation | Static rules making it possible to carry out a correlation between fault messages and CAS messages<br>Dynamic correlation rules:<br>Temporal rules of correlation between CAS messages and fault messages<br>Temporal rules of correlation between fault messages |
| MMI | Description & Navigation | Description of the MMI pages of the maintenance system<br>Description of the MMI pages related to each member system<br>Definition of the navigation between the pages of the MMI |
| | Option of the reports | Choosing of the display options for the fault reports presented to the operator |
| Interactions/member systems | Interactions | Definition of the actions allowing the operator to interact with the member Systems |

The following table illustrates examples of configurable items relating to the fault messages according to their type.

| Type of message | Configurable characteristics |
|---|---|
| Discrete | Name of the discrete (consistent with the interfaces defined for the aircraft)<br>Type: Either relating to the appearance of a fault, or relating to a response of an item of equipment within the framework of a test requested by the operator<br>Expected value: Binary value corresponding to the type of event defined<br>Confirmation time necessary before declaring the expected value as having appeared |
| BOFR | Filtering: If it is active, the message will be filtered when the operator carries out a test on the item of equipment<br>Characteristics of the label carrying the message (Number/Mask/Value) |
| A604 StdA | Type: Characterizes the category of the message from among several possible ones: Flight Deck Effect reported/no Flight Deck Effect reported/Class1, Class2,/Class3 |
| A624 | Fault mode: Information about the fault status, indicating whether the origin is related to a restart of the system and its restart conditions (Automatic, Manual, Internal, External, etc.)<br>Class of the fault: Makes it possible to categorize a fault according to its gravity in terms of visible cockpit effect |

| Type of message | Configurable characteristics |
|---|---|
| | Origin of the fault: Identification of one to three most probable origins of the fault. They will make it possible to guide the operator when he has to establish an overall diagnosis. |

The requirement capture device 100 is designed to generate a CMS configuration file 112 on the basis of a data set 102 previously input by the various contributors 109.

Advantageously, the users 109 are the Member System supplier, the aircraft designer and the designer of the maintenance system. User profiles specific to each user are defined in their role, their activities in the development of the system.

Advantageously, the management of user profiles makes it possible:
- to guarantee the homogeneity and completeness of the information necessary for the description of the system;
- to ease the work of each contributor by providing him with an MMI tailored to his requirement and by guiding him, by providing him with directives at each step of the input, and by providing him with a permitted range of use for each of the parameters;
- to allow the sharing of the information by centralizing it in one and the same tool shared by the users.

The CMS configuration file generated 112 describes all of the maintenance data. Its structure and its syntax adapt to a formal descriptive language (DSL) which makes it possible to ensure the complete and unambiguous nature of the information collected. Its content carries all of the concepts of the maintenance domain that are necessary for the implementation of the CMS system. Advantageously, this file will be able to be implemented in marked-up text form, programmed using a high-level language of XML type (eXtended Mark-Up Language).

The role of the verification module 104 is to verify the consistency and the compliance of the set of operator inputs, with regard to the DSL CMS 107, as well as the completeness and the non-contradiction of the inputs.

The input interface (MMI) advantageously comprises various fields for inputting the parameters of the CMS in accordance with a configuration domain and to be guided in this input. The interface also allows a user to consult and edit a predefined configuration.

Figure 2:
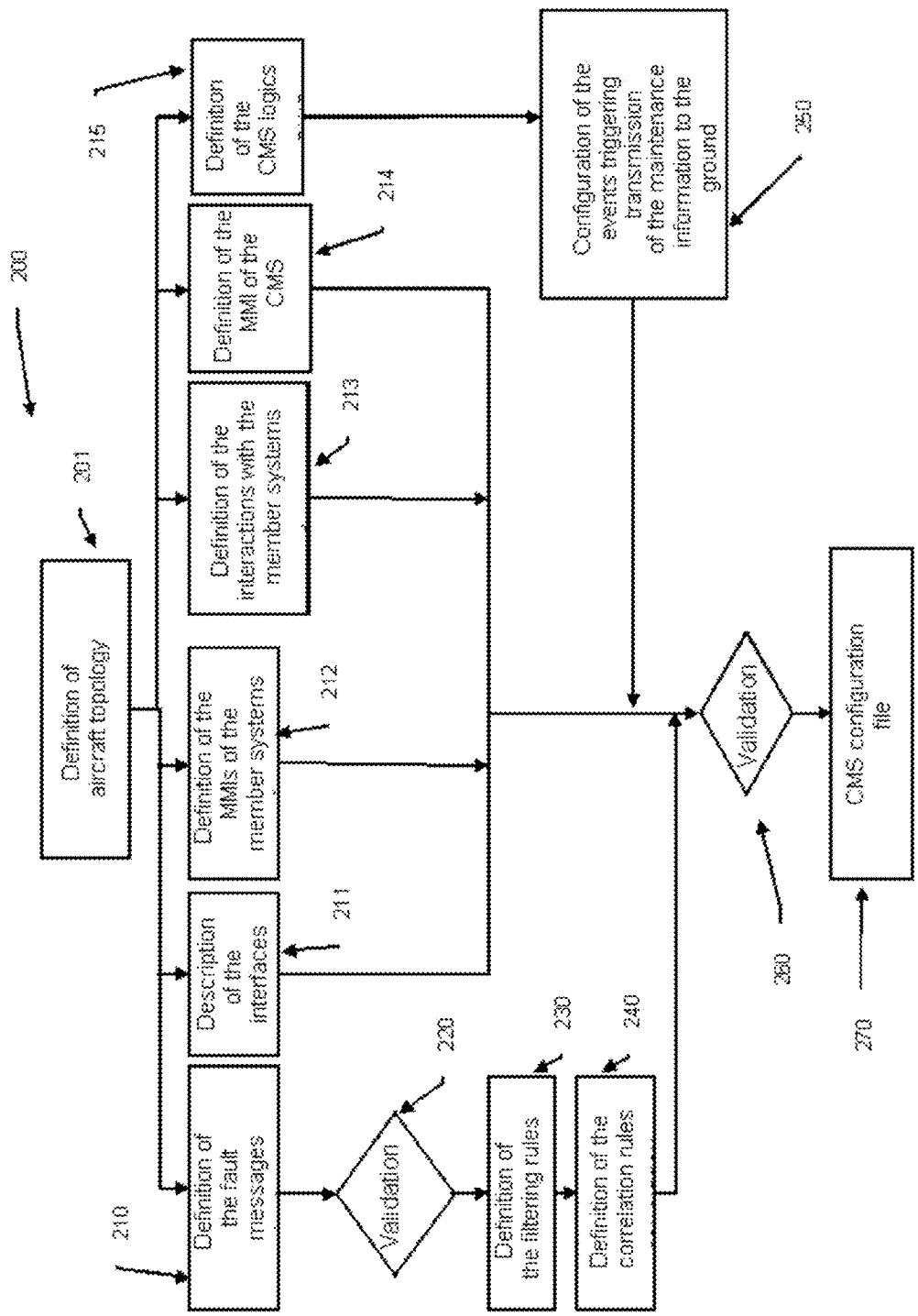
FIG. 2 shows the steps operated by the scheme of the invention for generating a CMS configuration file.

FIG. 2 shows the steps 200 operated by the scheme of the invention to generate a CMS configuration file in a preferential implementation, such as on a device 100.

Various parties are identified to carry out the data capture: an aircraft designer, a designer of the maintenance system and a member system supplier.

In a first step 201, the method allows the designer of the aircraft to define the aircraft topology which is used for the capture of the other information necessary for centralized maintenance.

After this step, the capture of the various items of information can be carried out in parallel (steps 210 to 215).

The various member system suppliers define the fault messages 210 of their system. A validation step 220 is carried out for each of the member systems. After validation, filtering rules are defined in step 230 and correlation rules are defined in step 240.

In step 211, the interfaces between each member system and the centralized maintenance are described. These interfaces are defined in a preferential manner by the designer of the maintenance system.

In step 212, the MMI pages of the member system are defined. These pages are defined in a preferential manner by the member system supplier.

In step 213, the various interactions between the centralized maintenance and the member system are defined, allowing the maintenance operator to interact with the system.

In step 214, the MMI of the CMS is defined in a preferential manner by the designer of the aircraft.

In step 215, the CMS logics are defined in a preferential manner by the designer of the aircraft.

The following step 250 consists in configuring the events triggering transmission of the maintenance information to the ground.

At the end of steps 240, 211, 212, 213, 214 and 250, a validation step 260 is carried out.

When the validation is correct, a CMS configuration file is generated in step 270.

To summarize, the major advantages of the present invention are:
- A widening of the configuration aspect of the items of equipment connected with the maintenance system, by:
  - managing items of equipment of different kinds;
  - catering for diverse communication protocols;
- A notion of process which is widened by:
  - the definition of parties and of roles which are specific to the domain and detailed for maintenance (Aircraft designer/Member systems supplier/Maintenance system designer);
  - the definition of a framework for collaboration between all the parties within a common workshop, which framework:
    - identifies the prerequisites between the phases;
    - makes it possible to parallelize a certain number of activities and ensures the independence of the parties;
    - defines meeting points necessary for the pursuance of the capture activities;
  - a diagram of sequences of the capture process, enhanced with the links to the parties;
  - the addition of a notion of centralization of all the data that are necessary for the design of a CMS system which makes it possible:
    - for the Member systems suppliers to validate their equipment more rapidly in the avionics follow-up;
    - to verify the completeness of the information relayed by all the items of equipment with respect to the topology of the aeroplane so as to identify gaps, inconsistencies or redundancies as early as possible;
- The configurability of the calculation logics for the maintenance function through the definition of the parameters involved in the calculation algorithms for the maintenance phases and commands;
- The addition of the configuration of the events triggering transmission of the maintenance information to the ground, so as to allow the maintenance operator to prepare his maintenance procedures without waiting for the aeroplane to land;

The configuration of the filtering and correlation functions which:

makes it possible to avoid the reporting of faults in cascades which subsequently render an investigation difficult;

favours the identification of the primary faults by eliminating the secondary faults, resulting from the effects of the former;

A modelling of the interactive actions, of dialogue of the operator to the equipment which:

relies on a specific formal language;

caters for three types of customizable actions (interactive tests for fault confirmation, recovery of recorded data of a system, recovery and presentation of the current data of a system);

allows each equipment supplier to customize his MMI in the structure and the navigation.

Thus the present description illustrates a preferential implementation of the invention, but is not limiting. An example has been chosen to allow good understanding of the principles of the invention, and a concrete application, but it is in no way exhaustive and must allow the person skilled in the art to make modifications and variants of implementation while retaining the same principles.

The present invention can be implemented on the basis of hardware and/or software elements. It can be available in the guise of a computer program product on a computer readable medium. The medium can be electronic, magnetic, optical, electromagnetic or be a broadcasting medium of infrared type. Such media are for example, semi-conductor memories (Random Access Memory (RAM), Read-Only Memory (ROM)), tapes, magnetic or optical diskettes or disks (Compact Disk-Read Only Memory (CD-ROM), Compact Disk-Read/Write (CD-R/W) and DVD).

The invention claimed is:

1. A configuration device configured to capture requirements for a centralized maintenance system (CMS) of an aircraft, the device comprising a centralized maintenance system computer having a memory, the device comprising:
   a definition module implemented by the centralized maintenance system computer and configured to define configuration domains for the CMS according to an aircraft topology;
   a module implemented by the centralized maintenance system computer and configured to create for each configuration domain a user profile having configuration domain rules;
   a user profile input module implemented by the centralized maintenance system computer and configured to input according to the configuration domain rules a set of parameters relating to each configuration domain;
   a verification module implemented by the centralized maintenance system computer and configured to verify for each user profile a compliance of the set of parameters input with the configuration domain rules in terms of structure, domain of variation and consistency of the values; and
   a generating module implemented by the centralized maintenance system computer and configured to generate a configuration file for each compliant user profile, the configuration file comprising the set of parameters of all the configuration domains,
   wherein the configuration file is configured to be implemented in a centralized maintenance system (CMS) of an aircraft.

2. The device according to claim 1, further comprising a storage module configured to store the configuration file.

3. The device according to claim 1, further comprising a user profiles management module coupled to the user profile input module.

4. The device according to claim 1, further comprising a man-machine Interface for each user profile input module.

5. The device according to claim 1, wherein each user profile input module further comprises means of interaction with a user.

6. The device according to claim 2, wherein the storage module comprises a first module for storing data relating to a definition of the configuration domain and a second module for storing the configuration files generated.

7. The device according to claim 1, comprising six configuration domains for defining:
   information characterizing member systems connected to the CMS;
   links between the CMS system and all the connected member systems and interfaces with systems providing an aircraft's state data;
   rules associated with filtering and correlation functions;
   MMI pages of the CMS system and of its member systems and navigation between the pages;
   maintenance related communications between a maintenance operator and the member systems; and
   logics specific to a CMS function.

8. A method executed on a centralized maintenance system computer for capturing requirements and configuring a centralized maintenance system (CMS) for aircraft, comprising:
   defining configuration domains for the CMS according to an aircraft topology with the centralized maintenance system computer;
   creating configuration domain user profiles having configuration domain rules with the centralized maintenance system computer;
   inputting for each user profile a set of parameters relating to each configuration domain according to the configuration domain rules with the centralized maintenance system computer;
   verifying for each user profile a compliance of the set of parameters input with the configuration domains rules in terms of structure, domain of variation and consistency of values with the centralized maintenance system computer; and
   generating in response to the verification step a configuration file for each compliant user profile, the configuration file comprising a set of parameters of all the configuration domains with the centralized maintenance system computer,
   wherein the configuration file is configured to be implemented in a centralized maintenance system (CMS) of an aircraft.

9. A computer program product, said computer program product comprising code instructions to perform the steps of the method according to claim 8, when said computer program product is executed on a centralized maintenance system computer.

10. A configuration device configured to capture requirements for a centralized maintenance system (CMS) of an aircraft, the device comprising:

a definition unit configured to define configuration domains for the CMS according to an aircraft topology implemented by a centralized maintenance system computer;

a unit configured to create for each configuration domain user profile having configuration domain rules implemented by the centralized maintenance system computer;

a user profile input unit configured to input according to the configuration domain rules a set of parameters relating to each configuration domain implemented by the centralized maintenance system computer;

a verification unit configured to verify for each user profile a compliance of the set of parameters input with the configuration domain rules in terms of structure, domain of variation and consistency of the values implemented by the centralized maintenance system computer; and a generating unit configured to generate a configuration file for each compliant user profile implemented by the centralized maintenance system computer, the configuration file comprising the set of parameters of all the configuration domains, wherein the configuration file is configured to be implemented in a centralized maintenance system (CMS) of an aircraft.

11. A centralized maintenance system of an aircraft implemented by the configuration file generated by the device according to claim 1.

12. The method according to claim 8 further comprising implementing a centralized maintenance system of an aircraft with the configuration file.

13. A centralized maintenance system of an aircraft implemented by the configuration file generated by the device according to claim 10.

* * * * *